Nov. 1, 1966 P. H. SMITH 3,283,113
ELECTRONIC OVEN FOR VENDING MACHINE USE
Filed July 9, 1963 2 Sheets-Sheet 1
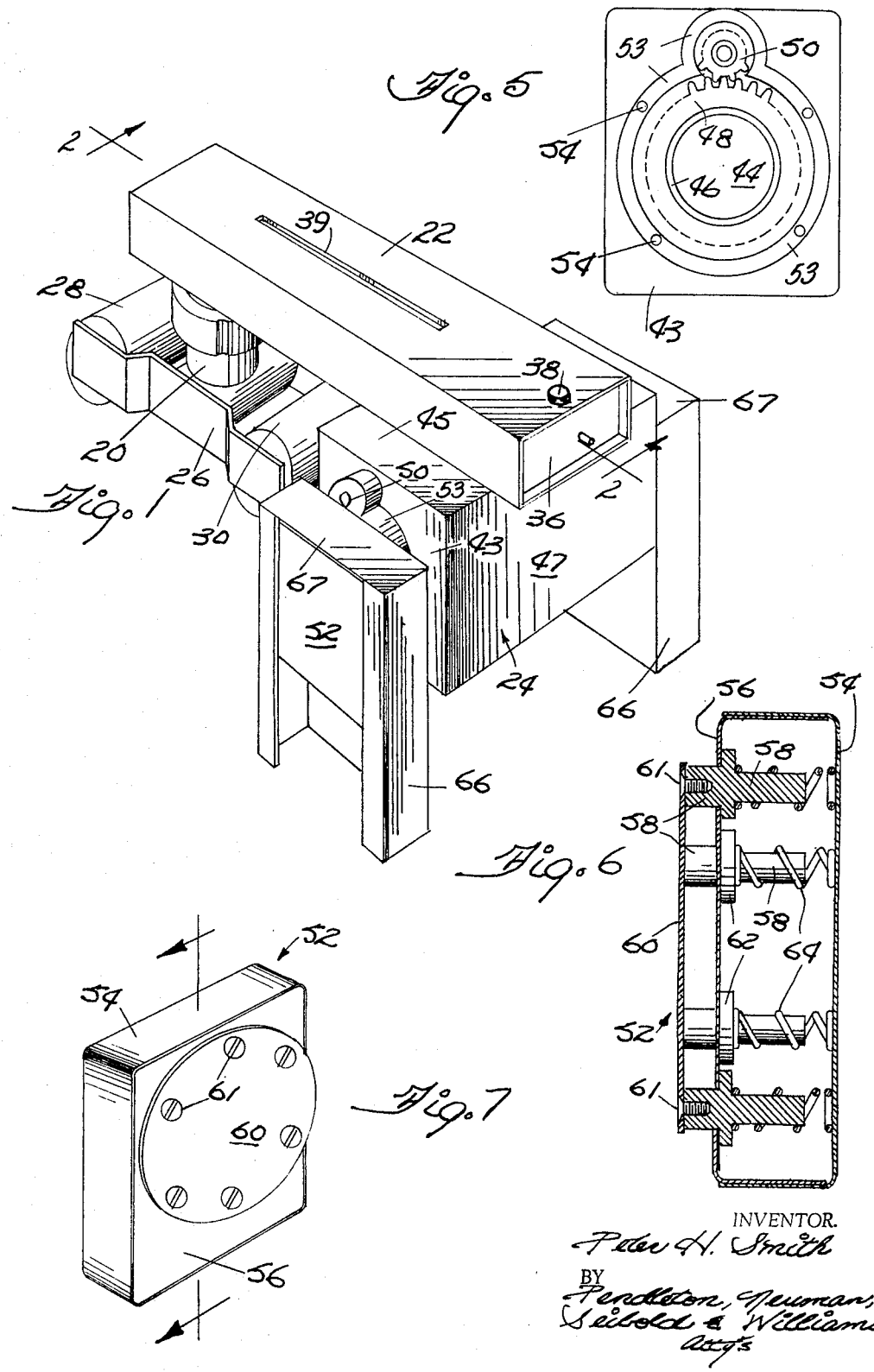
INVENTOR.
Peter H. Smith
BY Pendleton, Neuman, Seibold & Williams
Attys

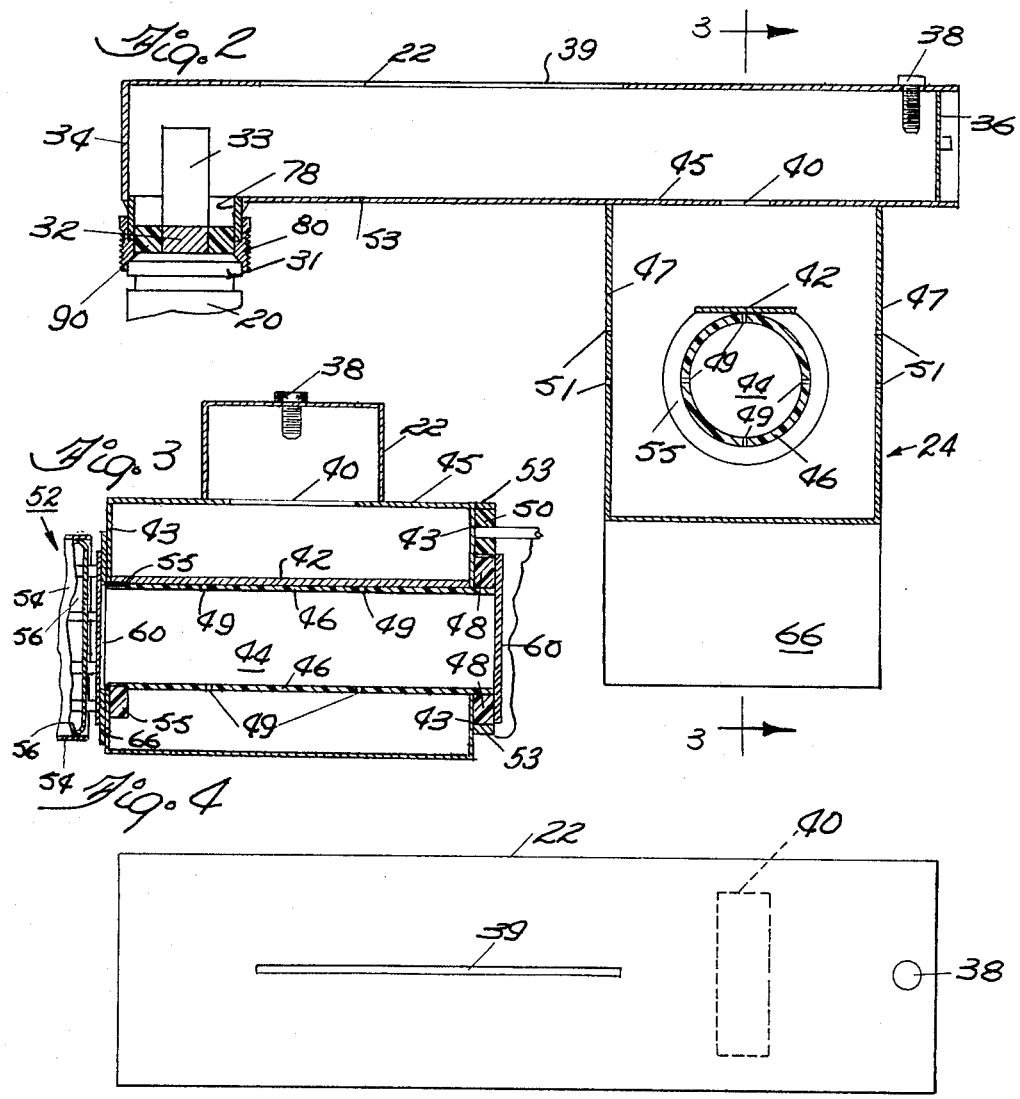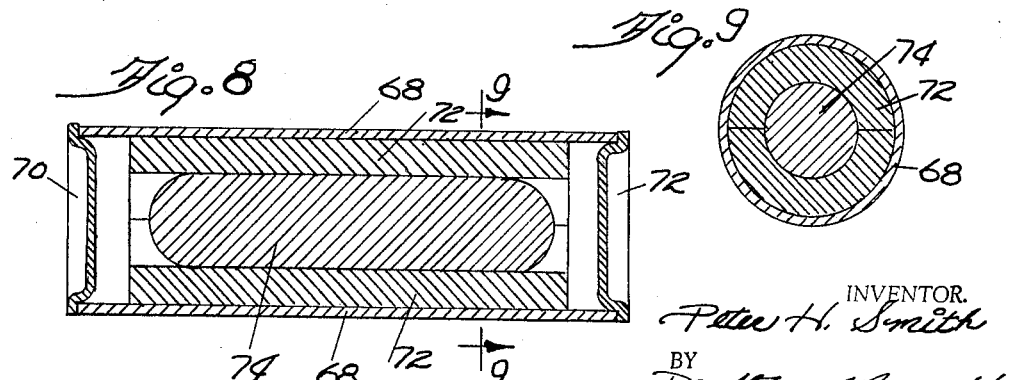

United States Patent Office 3,283,113
Patented Nov. 1, 1966

3,283,113
ELECTRONIC OVEN FOR VENDING MACHINE USE
Peter H. Smith, Maidenhead, England, assignor to J. Lyons & Company, Limited, London, England, a corporation of England
Filed July 9, 1963, Ser. No. 293,685
Claims priority, application Great Britain, June 12, 1963, 23,392/63
21 Claims. (Cl. 219—10.55)

This invention relates to electronic ovens and more particularly to relatively small microwave ovens suitable for use in vending machines for quickly cooking individual tubular units of the size and shape of a frankfurter in a bun.

Electronic ovens which have been known in the prior art have been relatively large and cumbersome, requiring a great deal of power to create a high intensity field distributed over the volume of the oven. In previous attempts to design and construct a smaller electronic oven, however, such as is required for cooking or warming a single frankfurter, it has not been possible to attain sufficiently good impedance matching with the source of RF energy to apply a high proportion of the input power to the frankfurter.

There has, therefore, been a need for a relatively small electronic oven for vending machine purposes and the like, which is capable of being matched fairly closely to the impedance of a source of microwave energy such as a magnetron or the like, and is particularly adapted for use with a single size and shape unit to be warmed, such as a frankfurter in a bun. When the impedance matching is good, the major proportion of input power is dissipated in the frankfurter and the bun, thereby warming them to the proper temperature in only a few seconds.

It is, therefore, a principal object of the present invention to provide a relatively small oven compartment adapted for vending machine purposes, and which is adapted to operate with substantially the same load at all times.

It is another object of the present invention to provide an oven having a cooking chamber in the form of a hollow cylinder having a diameter just sufficient to accommodate a frankfurter and a bun for cooking the same to eating temperature.

It is a further object of the present invention to provide a novel means of spreading the microwave field within and around an oven compartment to attain a substantially uniform field distribution along at least one dimension of a cooking chamber within the compartment.

It is another object of the present invention to provide a cooking chamber having a pair of doors located at opposite ends, which may readily be opened to permit entry and exit of food into the cooking chamber, but which substantially prevent radiation from escaping from within the cooking chamber while the cooking process is being carried on.

A further object of the present invention is to provide means for rotating the food within the oven compartment while the cooking process is being carried on.

Another object of the present invention is to provide a novel food package adapted to be readily inserted into a cylindrical cooking chamber.

Other objects and advantages of the present invention will become manifest by an examination of this specification and accompanying claims and drawings.

In one embodiment of the present invention, there is provided an electronic oven having an oven compartment, means for applying microwave radiation to the oven compartment through an aperture in a wall of the compartment, means for spreading the radiation to provide a substantially uniform field intensity in at least one dimension within a cooking chamber disposed in the oven compartment, and means for rotating food disposed within the cooking chamber while the food is being exposed to radiation.

Reference will now be made to the accompanying drawings in which:

FIGURE 1 is a perspective view of apparatus embodying the present invention;

FIG. 2 is a side elevation, partly in cross section, of the apparatus illustrated in FIG. 1, taken along the line 2—2 of FIG. 1;

FIG. 3 is a cross section of a portion of the apparatus illustrated in FIG. 1 taken along the line 3—3 of FIG. 2;

FIG. 4 is a plan view of a portion of the apparatus illustrated in FIG. 1;

FIG. 5 is an end view of the oven section of the apparatus of FIG. 1 with the door removed;

FIG. 6 is a cross-sectional view of one of the doors associated with the apparatus of FIG. 1;

FIG. 7 is a perspective view of one of the doors associated with the apparatus of FIG. 1;

FIG. 8 is a longitudinal cross-sectional view of a food container adapted to be employed with the apparatus of FIG. 1; and FIG. 9 is a transverse cross-sectional view of the food container of FIG. 8 taken along the line 9—9.

Referring now to the drawings, there is illustrated in FIG. 1 a perspective view of an electronic oven incorporating the present invention in which the microwave energy employed for cooking purposes is generated by a magnetron 20, passed through a wave guide 22 and inserted into an oven compartment 24 in order to cook the food located therein. The food located within the oven chamber 24 is cooked by the process of dielectric heating, well known to those skilled in the art, when exposed to electromagnetic radiation of a sufficiently high frequency. The frequency normally employed by electronic ovens is about 2450 megacycles, corresponding to a wave length in free space of about 12.2 centimeters.

The magnetron 20 is provided with a pair of pole pieces 26 (one of which is shown in FIG. 1) and a pair of permanent magnets 28 and 30 which are adapted to generate a magnetic flux in the pole pieces 26, thereby to expose the magnetron 20 to a substantially linear magnetic field. This magnetic field is essential to the proper operation of the magnetron 20, as is well understood by those skilled in the art, and the magnetron 20 generates microwave energy which is made available at a coaxial output (FIG. 2). The outer conductor 31 of the coaxial output is electrically connected to the wave guide 22, while the central conductor 32 is connected to a stub 33 which extends into the wave guide 22 and acts as an antenna to radiate electromagnetic energy within the wave guide 22.

The wave guide 22 is rectangular in cross section, having an aspect ratio of about 2 to 1, and is dimensioned so as to permit substantially only the dominant mode of transmission to propagate down the wave guide 22, such mode normally being identified as $TE_{01}$.

The wave guide 22 is provided with a pair of end walls 34 and 36, the end wall 36 being adjustable, and the antenna 33 being located nearest the end wall 34. The end walls 34 and 36 are located so as to minimize standing waves along the length of the wave guide 22. A tuning stub 38 is provided near the end wall 36 and is threaded into one of the side walls of the wave guide 22. By moving the tuning stub 38 into and out of the wave guide 22 by rotating its head in one direction or the other, a fine tuning is effected by which the standing waves existing along the length of the wave guide 22 may be substantially reduced. Coarse tuning may be effected by adjusting the position of the end wall 36 within the wave guide 22. The standing waves existing in the wave guide 22 may be inspected by inserting a probe in a slot 39.

The power transmitted along the wave guide 22 enters the oven compartment through an aperture or slot 40 in the wave guide 22, the slot 40 being located near the end wall 36 and postioned to be at a location of the wave guide 22 at which the field intensity has a maximum. Spaced within the oven compartment 24 from the slot 40 is a baffle 42 oriented in a direction parallel to the wave guide 22. The baffle 42 is maintained in position above the cooking chamber 44 within the oven compartment 24 by being welded to the end walls 43, and operates to shield the food within the cooking chamber 44 from direct radiation from the slot 40, and also to distribute the radiation emanating from the slot 40 axially along the length of the tubular cooking chamber 44. In this connection, the baffle may be thought of constituting, with the top wall 45 of the oven compartment 24, a wave guide which is fairly lossy because of spaces or gaps between the side edges of the baffle 42 and the side walls 47 of the oven compartment 42. Thus, as the energy propagates in opposite directions down the wave guide including the baffle 42, the energy escapes through the spaces or gaps within this wave guide substantially uniformly along its length. The result is a field within the oven chamber 42 which is substantially uniform along the length of the cooking chamber 44, although there may be appreciable gradients in directions transverse to this dimension. Field gradients in transverse dimensions, however, do not result in ununiform cooking of the product within the cooking chamber 44, as means is provided for rotating the cooking chamber 44 during the time it is exposed to microwave energy, thereby substantially uniformly heating or cooking the frankfurter and bun within the cooking chamber 44. The speed of heating is increased also because of the baffle 42, which permits the load represented by the frankfurter and bun to be closely matched in impedance to the output impedance of the magnetron 20.

As seen in FIG. 3, the cooking chamber 44 is defined by a tubular member 46 preferably formed of nylon and journaled at one of the side walls in a bearing 48, which also is preferably formed of nylon. The upper surface of the bearing 48 is milled away to provide a flat support surface for the baffle 42. At the other side of the oven compartment 24, the tube 46 is secured to a gear 48, which meshes with a second gear 50, each of the gears 48 and 50 being journaled in apertures provided in an end plate 53, as illustrated in FIG. 5. The end plate 53 is preferably secured to a side wall 43 of the oven compartment 24 by screws passing through bores 54 provided in the plate 53, which plate forms sleeves in which the gears 48 and 50 are supported.

A shaft (not shown) is secured to the gear 50, and is adapted to be rotated by an electric motor or the like, during the cooking process, thereby continuously rotating the cooking chamber 44 and also rotating any food within the cooking chamber 44 during the cooking process.

It will be appreciated that food may be inserted and withdrawn from the cooking chamber 44 by virtue of the apertures in the end walls 43 which are aligned with the tube 46, and into which the ends of the tube 46 extend. It is essential that these openings be covered, however, during the cooking process, to prevent energy from escaping from the oven compartment 24. This is necessary because prolonged exposure to high intensity radiation is harmful to living tissue, and the fourth harmonic of the frequency used in electronic ovens interferes with frequencies normally assigned to navigation aids for aircraft.

Accordingly, the present invention is provided with a pair of doors 52, as illustrated in FIGS. 6 and 7, which serve to substantially prevent any radiation from escaping through the openings at the ends of the tube 46.

The door 52 comprises an outer cover 54 substantially in the form of a rectangular parallelepiped, and an inner cover member 56 of similar configuration fits within the opening in the outer cover 54. The inner cover 56 is provided with a plurality of apertures through which extends studs 58 secured to a resilient closing plate 60 by screws 61 disposed on the outside of the inner cover member 56 and parallel thereto. The studs 58 are provided with shoulders 62 disposed in the inside of the chamber defined by the inner and outer covers 56 and 54, respectively, and a plurality of springs 64 are adapted to force the shoulder 62 outwardly thereby to urge the closing member 60 outwardly as far as permitted by collar 62 bearing against the inside wall of the inside cover member 56.

Each door assembly 52 is inserted in a channel shaped guide member 66 secured to an end wall 43 of the oven compartment 24, and the closing plate 60 is urged tightly into contact with a wall of the oven compartment 24 in which one of the openings to the cooking chamber 44 is disposed. The resiliency of the closing plate accounts for variations in the contour of the end wall 43. When the closing members 60 are disposed over the apertures leading to the cooking chamber 44, the springs 64 urge them tightly into contact with its cooperating wall substantially all about its periphery, thereby insuring a closure which is substantially leak-proof with regard to the high frequency radiation. The channel shaped guide members 66 are provided with end walls 67, which limit the permissible movement of the doors 52 to one direction from closed position.

Referring now to FIG. 8, there is illustrated a longitudinal cross-sectional view of a food package adapted for use with the present invention. The food package comprises a resilient tube 68, the ends of which are closed with end caps 70 and 72. The tube 68 and the end caps 70 and 72 are preferably constructed of cardboard or a similar inexpensive material, and serve to form a package of substantially uniform size, irrespective of variations in the size of the frankfurters and buns. In FIG. 8, there is illustrated in particular a bun 72 which has a hollowed out portion containing a frankfurter 74. A package, such as that illustrated in FIG. 8, may be stored indefinitely in a refrigerated compartment of a vending machine, and heated up to a temperature ready to serve by the oven of the present invention in approximately seven seconds. As noted above, during the seven seconds of exposure to microwave radiation, the cooking chamber 44 is rotated, thereby to insure uniform cooking of the package. If desired, the food product within the tube 68, or the entire assembly including the tube 68 may be wrapped in a flexible moisture-proof or dust-proof material, such as cellophane or Saran. The end walls 70 and 72 are not essential and are preferable only if the magazine of the vending machine requires that a substantial number of packages be stacked one upon the other, whereby the end caps 70 and 72 resist the tendecy of the lower package to flatten in response to pressure of packages piled on top of it.

In FIG. 9, there is illustrated a cross-sectional view of the food container of FIG. 8, and illustrates a preferred form of bun employed with a frankfurter when packaged for use in the improved cooking apparatus of the present invention. The bun 74 is substantially axially symmetric, and encloses the frankfurter in the central portion thereof, with substantially no air gap existing around the frankfurter. In order to conform to the shape illustrated in FIG. 9, the bun is preferably baked in molds having an interior surface conforming to a right circular cylinder, so that the bun may take the form illustrated in FIG. 9.

It has been found that the concentricity of the frankfurter and bun is important when it is desired to keep the magnetron 20 operating at a predetermined point of its performance curve. As there is a field gradient in directions transverse to the frankfurter, the load impedance, as seen by the magnetron, varies as the frankfurter is moved in a direction transverse to its length. This change in load impedance changes the operating point of the magnetron, and may reduce its efficiency. As the field strength is substantially uniform in a direction parallel to the length of the frankfurter, however, no substantial changes occur due to variations in the position of the frankfurter within the cooking chamber. If the frankfurter and bun are substantially axially symmetric, having an axis common with that of the tube 68, rotation of the food package does not materially affect the load impedance and the magnetron may therefore be operated at the same point of its performance curve for each of a number of different frankfurters, thereby operating to cook each of them uniformly.

Referring now to FIG. 2, the preferred manner of connecting the magnetron 20 with the wave guide 22 is illustrated. An aperture is provided in one wall of the wave guide 22 and a brass sleeve 78 is inserted within that aperture and secured to the wall of the wave guide 22 by soldering or the like. A fitting 80 is adapted to fit over the sleeve 78, and is provided with a centrally disposed bore aligned with the inside surface of the sleeve 78, and having a recess adapted to accommodate the external conductor 31 of the magnetron 20. The outwardly facing surface of the outer conductor 31 normally comprises a reference plane, and the center conductor 32 of the coaxial output from the magnetron is oriented in a direction substantially normal to the reference plane. A stub 33 is secured to the center conductor 32 and extends into the wave guide 22 to radiate power to be propagated down the wave guide. Adjacent the reference plane, there is disposed a dielectric ring 90, preferably composed of Teflon having a central aperture which is sufficient to pass the central conductor 32, and an outer diameter such as to fit tightly within the central bore of the fitting 80. It will be appreciated that at the position of the dielectric ring 90, there is an abrupt change in the dielectric constant of the material separating the inner and outer conductors of the coaxial line, without any corresponding change in dimensions of the inner or outer conductors. There is accordingly a sharp change in the impedance of the coaxial line at this point, which manifests itself by causing reflections to occur. Accordingly, the standing wave ratio existing within the magnetron 20 increases, and the preferred standing wave ratio is about 1.5 to 1. The increased standing wave ratio at a phase corresponding to the sink region of the magnetron increases the power delivered to the load by about 300 or 400 watts when a 2.0 kilowatt magnetron is employed. It should be noted that the standing wave ratio of 1.5 to 1 exists entirely within the magnetron 20 the wave guide 22 being tuned by the tuning sutb 38 and the movable wall 36 to approach a standing wave ratio of approximately 1 to 1.

The tube 46, which defines the cooking chamber 44, is preferably provided with a plurality of apertures 49, which permit steam or other vapors, which may be generated during the heating of the food, to escape into the oven compartment. Any vapors within the compartment are preferably forced out through a plurality of small holes 51 in the side walls 47 of the compartment, by a stream of air flowing through the wave guide 22 and through the aperture 40. The air is introduced through an aperture 53 in the wave guide by fan means (not shown). This means insures that no moisture is permitted to flow back along the wave guide 22 to interfere with the operation of magnetron 20.

In one exemplary embodiment of the present invention, the magnetron employed is an Amperex 7292 water-cooled magnetron, operating at a frequnecy of 2450 megacycles, and the preferred dimensions of the wave guide are 43 mm. x 86 mm.; the center of the stub 33 is located 22 mm. from the wall 34, the distance between the center of the stub 33 and the center of the aperture 40 is 223 mm., the aperture 40 is 20 mm. x 60 mm., the baffle is 18 SWG steel 1½″ x 7″ (about .31λ x 1.5λ, where λ is the wavelength of the microwave energy in free space), the baffle is disposed adjacent the tube 46, which is disposed 11¹⁷⁄₃₂″ (.32λ) from the top wall 45, the Teflon ring 90 has a thickness of 10 mm. the oven chamber inside dimensions are 4⅛″ (.86λ) wide by 4⅝ (.96λ) high by 7″ (1.5λ) long, and the tube 46 defining the cooking chamber 44 is 1¹⁵⁄₁₆″ inside diameter with a wall thickness of ⅝″.

The foregoing will so completely and fully describe the present invention as to enable others skilled in the art, by applying current knowledge, to adapt the same for use under varying conditions of service without departing from the essential features of novelty involved which are intended to be defined and secured by the appending claims.

What is claimed is:

1. In an electronic oven having a source of microwave energy, an oven compartment having at least first and second parallel walls and a third wall interconnecting said first and second walls, and means for introducing said energy in the form of radiation through an aperture in said third wall, the combination comprising an elongate cooking chamber disposed within said oven compartment and extending between said first and second walls, and a rectangular baffle plate interposed between said aperture and said cooking chamber, the end edges of said baffle plate abutting said first and second walls.

2. In an electronic oven having a source of microwave energy, an oven compartment having at least first and second opposed end walls, first and second opposed side walls interconnecting said first and second end walls, and top and bottom walls interconnecting said end and side walls, and means for introducing said energy in the form of radiation through an aperture in said top wall, the combination comprising a cooking chamber disposed within said oven compartment and extending between said end walls, said cooking chamber being defined by a hollow tube of low loss dielectric material and a rectangular baffle plate interposed between said cooking chamber and said aperture in an attitude parallel to the axis of said tube and normal to a line drawn between the axis of said tube and said aperture, said baffle plate extending between said end walls and with the end edges of said baffle plate abutting said end walls and the side edges of said baffle plate being spaced from said side walls.

3. In an electronic oven having a source of microwave energy, an oven compartment having at least first and second parallel walls and a third wall interconnecting said first and second walls and substantially perpendicular thereto, and a wave guide for transmitting said energy to an aperture in said third wall and introducing said energy in the form of radiation through said aperture into said oven compartment, the combination comprising a cooking chamber disposed within said oven compartment for supporting a frankfurter in a bun, and a rectangular baffle interposed between said cooking chamber and said aperture, said baffle extending between said first and second walls and being disposed substantially parallel to said third wall with the end edges of said baffle abutting said first and second walls, said aperture comprising a rectangular aperture having its shorter dimension parallel with said first and second wall.

4. In an electronic oven having a source of microwave energy, an oven compartment having at least first and second parallel end walls and first and second parallel side walls joining respective edges of said first and second end walls, and an additional wall joining said end walls and side walls, and means for introducing said energy in the form of radiation through an aperture in said additional wall, a tubular cooking chamber disposed in said oven compartment extending between said end walls, said cooking chamber being defined by a tube of low loss dielectric material, and a rectangular baffle disposed contiguous with said tube between said cooking chamber and said aperture, the end edges of said baffle being connected to the end walls of said oven compartment and the side edges of said baffle being parallel to said side walls and spaced therefrom by a distance at least as great as a quarter wave length of said microwave radiation in free space, said baffle being spaced from said additional wall by at least a quarter wave length of said microwave radiation in free space.

5. In an electronic oven having a source of microwave energy, an oven compartment, and means for coupling said source with said compartment, the combination comprising a cooking chamber defined by a tubular member disposed between two opposing walls of said oven compartment, bearing means secured to each of said opposing walls for supporting said cooking chamber, said bearing means comprising annular members of low-loss dielectric material secured to said opposed walls, and means for rotating said tubular member relative to said opposed walls, said rotating means including a gear of low-loss dielectric material disposed within said oven compartment and secured to said tubular member.

6. Apparatus according to claim 5, wherein said gear is journaled in a conductive sleeve secured to one of said opposed walls.

7. Apparatus according to claim 6, including a second gear adapted to mesh with said first gear, said gears being journaled in a pair of conductive sleeves formed integrally with each other and secured to one of said opposed walls.

8. Apparatus according to claim 5, including a resilient, conductive door member adapted to cover an end of said tube to prevent radiation from escaping from said compartment, and resilient means urging said door member into intimate contact with a plurality of points of a wall of said compartment.

9. An electronic oven comprising a source of microwave energy, an oven compartment, means for introducing said energy in the form of radiation through an aperture into said compartment, means for supporting material to be cooked within said compartment, and a baffle interposed between said supporting means and said aperture, the volume of said compartment being about 1.2 times the cube of the wavelength of said microwave energy in free space.

10. An electronic oven comprising a source of microwave energy, an oven compartment, means for introducing said energy in the form of radiation through an aperture into said compartment, supporting means for supporting material to be cooked within said oven compartment, and a conductive baffle interposed between said supporting means and said aperture, the cross-sectional area of said compartment in a plane parallel to the plane of said aperture being about 1.2 times the square of the wavelength of said microwave energy in free space.

11. An electronic oven comprising a source of microwave energy, an oven compartment, means for introducing said energy in the form of radiation through an aperture into said compartment, supporting means for supporting means and said aperture, the area of said compartment in a plane perpendicular to the plane of said antenna slot and perpendicular to the long dimension of said slot being about 0.2 times the square of the wavelength of said microwave radiation in free space.

12. An electronic oven comprising a source of microwave energy, an oven compartment, means for introducing said energy in the form of radiation through an aperture into said compartment, supporting means for supporting material to be cooked within said oven compartment, and a conductive baffle interposed between said supporting means and said aperture, the area of said compartment in a plane perpendicular to the plane of said aperture and parallel to the long dimension of said aperture being about 1.4 times the square of the wavelength of said microwave energy in free space.

13. An electronic oven comprising a source of microwave energy, an oven compartment, means for introducing said energy in the form of radiation through an aperture into said compartment, supporting means for supporting material to be cooked within said oven compartment, and a conductive baffle interposed between said supporting means and said aperture, the dimensions of said compartment being approximately $1.0\lambda$ in a direction normal to the plane of said aperture, $1.5\lambda$ in a dimension parallel to the plane of said aperture and parallel to the long dimension of said aperture and $.9\lambda$ in a direction parallel to the plane of said aperture and perpendicular to the long dimension of said aperture, where $\lambda$ is the wavelength of said microwave energy in free space.

14. An electronic oven comprising a source of microwave energy, an oven compartment, means for introducing said energy in the form of radiation through an aperture into said compartment, supporting means for supporting material to be cooked within said oven compartment, and a conductive baffle interposed between said supporting means and said aperture, wherein said baffle is a thin rectangular metal sheet having dimensions approximately $.3\lambda$ by $1.5\lambda$ where $\lambda$ is the wavelength of said microwave energy in free space.

15. An electronic oven comprising a source of microwave energy, an oven compartment, means for introducing said energy in the form of radiation through an aperture into said compartment, supporting means for supporting material to be cooked within said oven compartment, and a conductive baffle interposed between said supporting means and said aperture, said baffle being disposed about 0.3 times the wavelength of said microwave energy in free space from said aperture.

16. An electronic oven comprising a source of microwave energy, an oven compartment, means for introducing said energy in the form of radiation through an aperture into said compartment, a tubular support member disposed within said compartment and adapted to support a food article within said tube, and a conductive baffle interposed between said aperture and said tube, having a dimension parallel to the axis of said tube substantially equal to the length of said tube, and having its transverse dimension slightly less than the inside diameter of said tube.

17. Apparatus according to claim 16, wherein said baffle is contiguous with said tube.

18. Apparatus according to claim 16, wherein said baffle is disposed about 0.3 times the wavelength of said microwave energy in free space from said aperture.

19. An electronic oven having a source of microwave energy, an oven compartment, means for introducing said energy in the form of radiation through an aperture in a wall of said compartment, a tubular cooking chamber disposed in said oven compartment, said cooking chamber being defined by a tube of low-loss dielectric material, and a rectangular baffle disposed contiguous with said tube between said cooking chamber and said aperture, two edges of said baffle parallel to the axis of said cooking chamber being spaced from the walls of said compartment by at least a quarter wavelength of said microwave energy in free space, and said baffle being spaced from said aperture by at least a quarter wavelength of said microwave energy in free space.

20. An electronic oven for heating tubular food articles such as hot dogs comprising a source of microwave energy, an oven compartment, means for introducing said energy in the form of radiation through an aperture into said compartment, means for supporting said tubular food products within said compartment, said aperture comprising a rectangular slot in a wall of said compartment, the long dimension of said slot being oriented parallel with said tubular food product, and a rectangular conductive baffle interposed between said tubular product and said aperture, the long dimension of said baffle being aligned and parallel with the axis of said tube.

21. Apparatus according to claim 20, including means for supporting said tube within said compartment, said supporting means including means for rotating said tubular product about its axis.

References Cited by the Examiner

UNITED STATES PATENTS

| | | | |
|---|---|---|---|
| 2,582,174 | 1/1952 | Spencer | 99—221 |
| 2,583,338 | 1/1952 | Morse et al. | 219—10.55 |
| 2,733,650 | 2/1956 | Williams | 219—10.55 |
| 2,783,346 | 2/1957 | Warren | 219—10.55 |
| 2,820,127 | 1/1958 | Argento et al. | 219—10.55 |
| 2,827,537 | 3/1958 | Haagensen | 219—10.55 |
| 2,965,015 | 12/1960 | Huchok | 219—10.55 |
| 2,965,496 | 12/1960 | Serdar | 99—171 |
| 3,091,172 | 5/1963 | Wildemann | 219—10.55 |

FOREIGN PATENTS

| | | |
|---|---|---|
| 368,286 | 5/1963 | Switzerland. |
| 1,249,130 | 11/1960 | France. |

RICHARD M. WOOD, *Primary Examiner.*

ROBERT N. JONES, *Examiner.*

L. H. BENDER, *Assistant Examiner.*

UNITED STATES PATENT OFFICE
CERTIFICATE OF CORRECTION

Patent No. 3,283,113                          November 1, 1966

Peter H. Smith

It is certified that error appears in the above identified patent and that said Letters Patent are hereby corrected as shown below:

Column 3, lines 26 and 30, "42", each occurrence, should read -- 24 --. Column 5, line 55, "sutb" should read -- stub --; line 69, before "magnetron" insert -- the --. Column 7, line 60, before "means" insert -- material to be cooked within said oven compartment, and a conductive baffle interposed between said supporting --.

Signed and sealed this 12th day of August 1969.

(SEAL)
Attest:

Edward M. Fletcher, Jr.                      WILLIAM E. SCHUYLER, JR.
Attesting Officer                              Commissioner of Patents